(12) United States Patent
Mangelsdorf

(10) Patent No.: US 7,184,865 B2
(45) Date of Patent: Feb. 27, 2007

(54) FAULT DETECTION LOGIC FOR ENGINES

(75) Inventor: Torsten Mangelsdorf, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 543 days.

(21) Appl. No.: 10/759,220

(22) Filed: Jan. 20, 2004

(65) Prior Publication Data

US 2005/0071072 A1    Mar. 31, 2005

(30) Foreign Application Priority Data

Jan. 21, 2003    (DE)    ............... 103 02 074

(51) Int. Cl.
*G01M 17/00*    (2006.01)

(52) U.S. Cl. ............... 701/29; 701/31; 701/34; 701/99; 701/100

(58) Field of Classification Search ............... 701/1, 701/3, 29, 31, 32, 33, 34, 35, 99, 100; 60/772, 60/773, 779
See application file for complete search history.

(56) References Cited

U.S. PATENT DOCUMENTS

| | | | |
|---|---|---|---|
| 4,136,517 A | 1/1979 | Brown | |
| 4,217,754 A | 8/1980 | Schmidt-Roedenbeck et al. | |
| 4,249,238 A | 2/1981 | Spang, III et al. | |
| 4,344,141 A | 8/1982 | Yates | |
| 4,454,754 A | 6/1984 | Zagranski et al. | |
| 4,507,915 A | 4/1985 | Evans | |
| 4,545,198 A | 10/1985 | Yoshida | |
| 4,622,808 A * | 11/1986 | Kenison et al. | ............... 60/795 |
| 4,768,338 A * | 9/1988 | Lindler et al. | ............. 60/39.27 |
| 4,794,755 A | 1/1989 | Hutto, Jr. et al. | |
| 4,817,046 A | 3/1989 | Rice et al. | |
| 5,115,635 A | 5/1992 | Jennings et al. | |
| 7,065,973 B2 * | 6/2006 | Rowe | .......................... 60/779 |

FOREIGN PATENT DOCUMENTS

| | | |
|---|---|---|
| DE | 2730083 | 1/1978 |
| DE | 2702564 | 7/1978 |
| DE | 3023550 | 1/1981 |
| DE | 3328608 | 2/1984 |
| DE | 3830805 | 3/1990 |
| EP | 0358139 | 6/1993 |

OTHER PUBLICATIONS

German Search Report dated Jan. 21, 2003.
European Search Report dated May 7, 2004.

* cited by examiner

*Primary Examiner*—Richard M. Camby
(74) *Attorney, Agent, or Firm*—Timothy J. Klima

(57) ABSTRACT

In a fault detection logic for an engine controller for the detection of too low or too high a thrust relative to an intended positive or negative acceleration, the positive or negative error of the engine pressure ratio and the positive or negative acceleration of an engine shaft are simultaneously compared with a specified threshold, with the simultaneously determined transgression of both thresholds safely identifying a loss of thrust control. Disturbances caused by engine surge or signal noise are eliminated.

16 Claims, 2 Drawing Sheets

FAULT DETECTION LOGIC FOR ENGINES

This application claims priority to German Patent Application DE10302074.8 filed Jan. 21, 2003, the entirety of which is incorporated by reference herein.

BACKGROUND OF THE INVENTION

This invention relates to a fault detection logic for an engine control system to discover any loss of thrust control of the control loop.

The control of engine thrust—and thus the control of the fuel flow required for the respective thrust—is effected in a known control system on the basis of the pressures measured at the inlet and at the outlet of the engine as the primary control parameter and the engine pressure ratio established therefrom. A positive difference between the command value and the actual value of the pressure ratio indicates an intended acceleration of the engine and, thus, an increase in fuel supply, while a negative value of the difference between the command value and the actual value of the engine pressure ratio signifies an intended deceleration of the engine and a corresponding decrease in fuel supply. Another primary control parameter is the low-pressure shaft speed.

Since the required thrust is to be achieved and maintained with minimum deviation, the fuel metering unit (FMU) is an extremely safety-relevant component, this unit delivering that quantity of fuel to the engine combustion chamber that corresponds to the thrust necessary to influence, as desired and with minimal fault, the movement and speed of a body attached to the engine.

For the detection of faults and operating states, an electronic engine controller (EEC) is integrated in the engine. The respective fault detection logic is capable of discovering certain incidents, such as the defect of a solenoid installed in the fuel metering unit for controlling the fuel flow or the absence of a feedback signal between the fuel metering unit and the electronic engine controller. If a fault is identified by the fault detection logic, the redundancy of the system allows the detection process to be repeated in another lane. If the initially detected fault is found to re-appear in the second lane, appropriate measures will be taken to eliminate the fault, or the engine will be shut down, as applicable.

In certain cases—for example if voltage conditions in the solenoid system of the fuel metering unit are affected by power supply deficiencies resulting from defects in connecting leads, connectors or similar items—the fault detection logic will not be able to sense the resultant variations in fuel flow. This inability manifests itself in a departure of the actual value of thrust and engine pressure ratio from the specified command value which is not recognized as fault by the fault detection logic. In other words, this type of control which uses a primary control parameter, here the engine pressure ratio, will fail to detect an overshoot or undershoot in thrust which is unrelated to the specified command value. If an engine fails to respond as a result of such a control behavior, i.e. a loss of thrust control without reaction of the engine controller or without indication of the malfunction, catastrophic consequences may occur. For example during the take-off run, an aircraft powered by an engine controlled according to the described state of the art can overshoot the end of the runway if excessive thrust occurs which is undetected by the control system, or it may depart from the runway if the thrust delivered by the two engines is asymmetrical. Undetected excessive thrust of one of the two engines is also critical shortly before touchdown, in particular, since the thrust asymmetry resulting therefrom may cause the aircraft to leave the runway. This situation, in which a fuel quantity is delivered to the engine combustion chamber which departs from the specified command value, is also termed loss of thrust control (LOTC). Since the fault detection system does not recognize this fault, catastrophic consequences as those described above may occur. Generally, a loss of thrust control may occur throughout the flight, however, the consequences can be more serious in the above situations than, for example, at great altitude.

BRIEF SUMMARY OF THE INVENTION

The present invention, in a broad aspect, provides a fault detection logic for a control system of an engine which safely recognizes any loss of thrust control.

It is a particular object of the present invention to provide a method in accordance with the failure detection logic described herein. Further objects and advantages of the present invention are will be apparent from the description below.

Accordingly, in the method of the present invention, a first control parameter with negative or positive sign corresponding to acceleration or deceleration is initially determined from which the respective control of thrust is then inferred. Since this statement does not make allowance for engine defects, for example in connection with the power supply of the fuel metering valve, and a loss of thrust control resulting therefrom is not recognized, a second thrust-dependent positive or negative control parameter is determined and established. If a logic query establishes that the parameter values determined transgress at the same time the respective specified threshold value, a hang in positive or negative acceleration determined by the second control parameter, with simultaneous, definite departure of the commanded engine pressure ratio from the actual engine pressure ratio, is a clear indication of a loss of thrust control and triggers a change-over to a second lane of the redundant system and/or an alarm signal. As a first control parameter, the difference between the command value and the actual value of the engine pressure ratio is used which, according to an intended acceleration or deceleration, is either positive or negative. As a second control parameter, the positive or negative acceleration of an engine shaft can be applied. This method ensures that a loss of thrust control is indicated. The method avoids erroneous fault detection by signal noise and, in addition, provides measures against false indications of loss of thrust control caused by engine surge.

BRIEF DESCRIPTION OF THE DRAWINGS

The present invention is more fully described in the light of the accompanying drawings showing an embodiment. In the drawings.

DETAILED DESCRIPTION OF THE INVENTION

The term "underthrust" as used herein designates a lower thrust than that commanded by the pilot via the thrust lever setting, while the term "overthrust" conversely refers to a higher thrust than that commanded. Overthrust and underthrust are caused by a fault in the control system and denote a loss of thrust control (LOTC) which must be recognized and indicated and to which the control system must respond appropriately.

Figure 1:
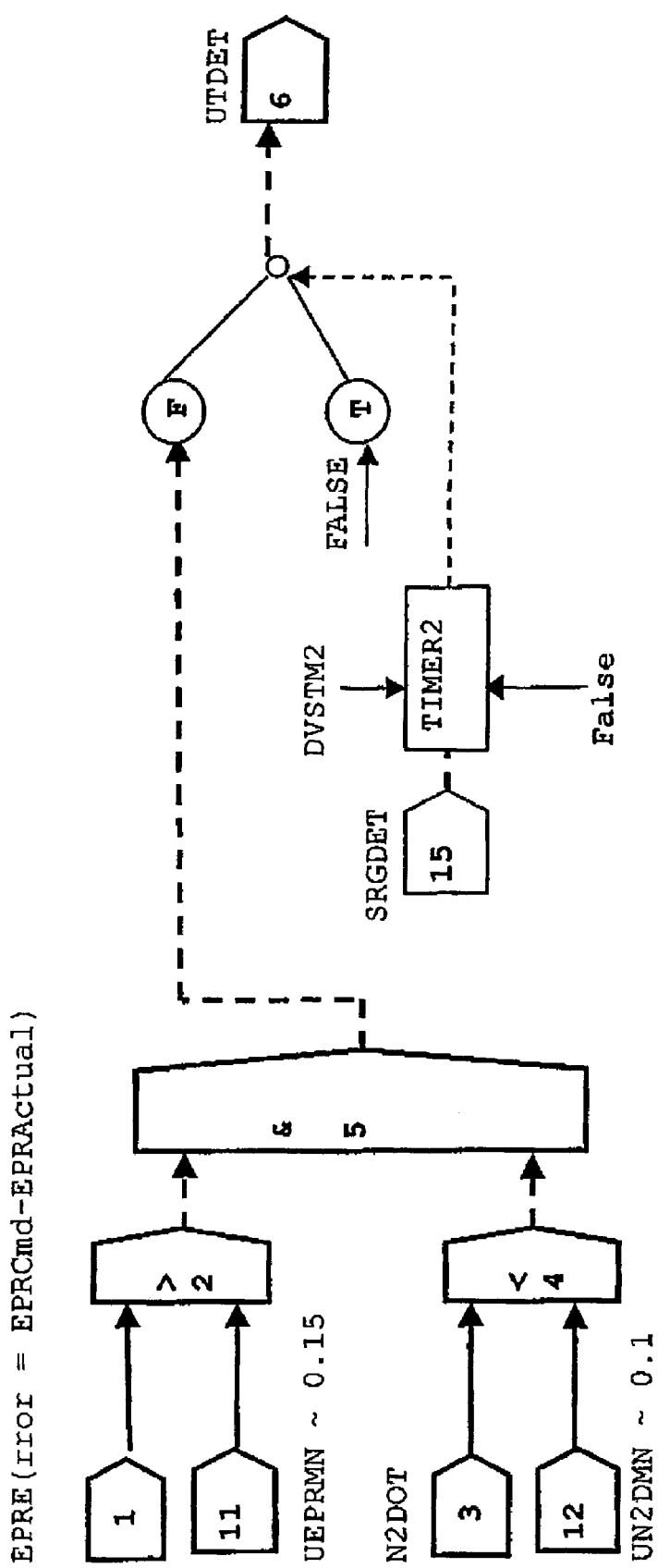
FIG. 1 is a logic flowchart for the detection of thrust undershooting a command value for an intended acceleration (underthrust detection—UTDET)
Figure 2:
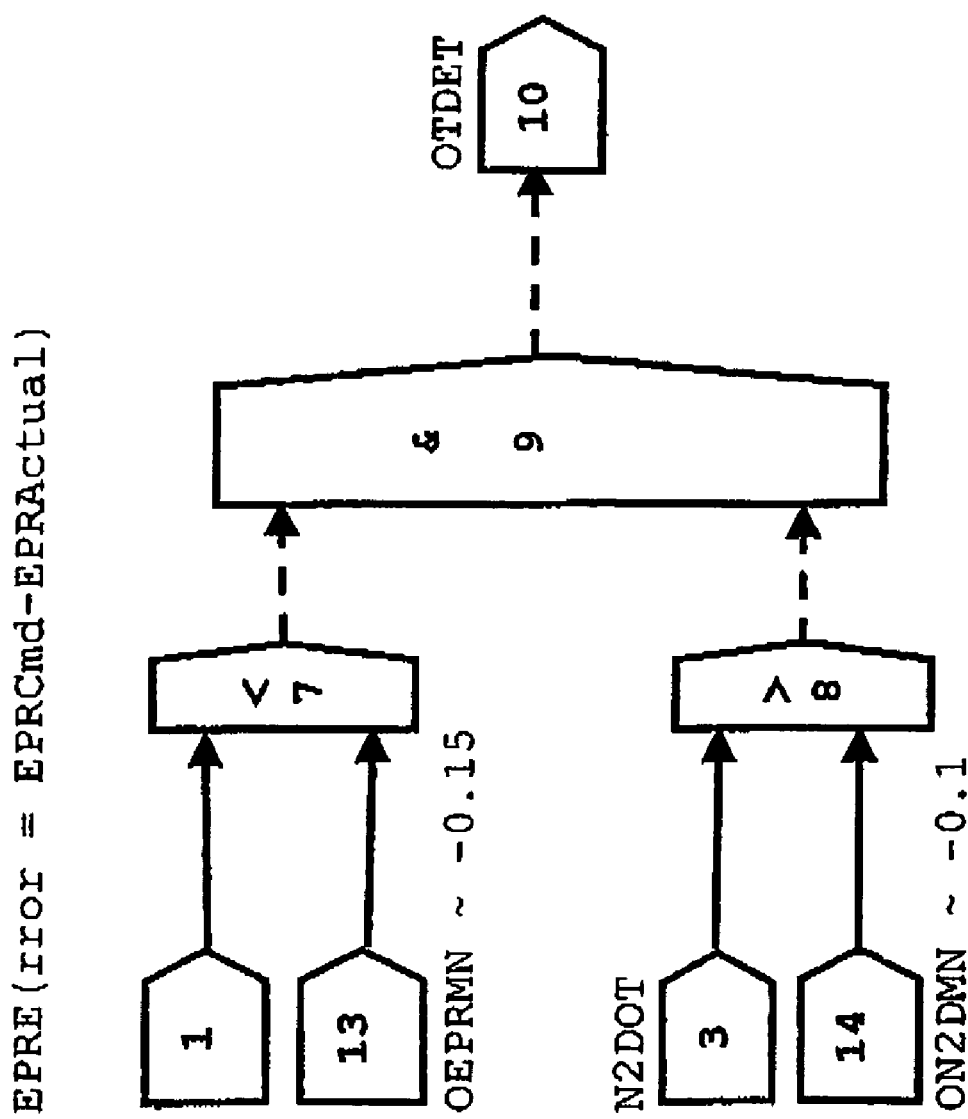
FIG. 2 is a logic flowchart for the detection of thrust overshooting a command value for an intended deceleration (overthrust detection—OTDET).

As shown in FIG. 1 and FIG. 2, the difference +/−EPRerror between the command value and the actual value is determined in step 1 as the first control parameter from the actual value of the engine pressure ratio (EPRactual) between the outlet and the inlet of the engine as a measure of the thrust and from the set command value of the engine pressure ratio (EPRcmd) as a measure of the demanded thrust. If the difference is positive, more fuel will be delivered via a fuel-metering unit (not shown) to the engine combustion chamber and the engine will be accelerated. Conversely, a negative difference value means that the fuel flow is throttled and the engine decelerated (negative acceleration, thrust decrease). A definite deviation of +/−EPRerror,thresh between the actual value and the command value of the engine pressure ratio is determined in step 2 (intended acceleration as per FIG. 1) or step 7 (intended deceleration as per FIG. 2) in a logic module.

In step 3 (as per FIG. 1 and 2), a second control parameter which also designates the acceleration or deceleration of the engine is determined with the acceleration or deceleration +/−N2dot of the engine high-pressure shaft and compared as per steps 4 and/or 8 in a logic module with a specified threshold +/−N2dot,thresh of the positive or negative acceleration of the high-pressure shaft.

A logic query as per steps 5 and 9 establishes if the two parameters EPRerror and N2dot simultaneously exceed the specified thresholds.

If, as per FIG. 1, both conditions of the logic query 5 are satisfied for an intended acceleration, i.e. that with EPRerror>EPRerror,thresh and N2dot<N2dot,thresh
—with EPRerror,thresh=+0.15 and N2dot,thresh=+0.1%/sec in the present example— the difference of the engine pressure ratio overshoots the specified threshold and, simultaneously, the acceleration of the high-pressure shaft undershoots the specified threshold, the engine actually fails to carry out the intended acceleration. Furthermore, if no engine surge is noted in step 15, an underthrust situation has occurred, i.e. a thrust which is too low for an intended acceleration. This underthrust situation (UTDET) is indicated in step 6.

Conversely, if both conditions of the logic query 9 are satisfied for an intended deceleration as per FIG. 2, i.e.

EPRerror<EPRerror,thresh and N2dot>N2dot,thresh
—with EPRerror,thresh=−0.15 and N2dot,thresh=−0.1%/sec in the present example— the engine fails to carry out the intended deceleration. Accordingly, an overthrust situation has occurred, i.e. a thrust which is too high for an intended deceleration. As per FIG. 2, this overthrust situation (OTDET) is indicated in step 10.

Thus, a loss of thrust control for an intended acceleration or deceleration of the engine, for example in the case of an undetected defect of the fuel metering valve, can safely be indicated, this loss of thrust control being reacted upon by the control system to avoid adverse consequences caused by an—actual—thrust situation at the respective engine that does not correspond to the intended positive or negative acceleration. The indication in steps 6 and 10 as the outcome of the logic query as per steps 5 and 9 denotes by a signal whether or not a loss of thrust control of the control system exists, with the redundant control system being changed over to another lane, or the engine being shut down, if a loss of thrust control is found to exist also in this other lane, as applicable.

The thresholds EPRerror,thresh and N2dot,thresh entered in steps 11 and/or 12 as per FIG. 1 for determining underthrust and in steps 13 and 14 as per FIG. 2 are designated in the drawing with −UEPRMN and −UN2DMN or +OEPRMN and +ON2DMN, respectively, and set such that they represent an underthrust detection limit or an overthrust detection limit (threshold value), respectively, to avoid disturbances caused by signal noise.

In addition, step 15, which is simultaneously included in the fault detection logic, avoids falsification of the statement made on thrust control, or loss of thrust control, under certain conditions, i.e. if engine surge is detected (SRGDET).

If a disturbance by the so-called engine surge is noted in step 15, in which both conditions of the logic query 5 are satisfied, but actually do not represent a loss of thrust control, the result of the logic query 5 is set to "false" by way of a timer and a switch for a certain period of time to avoid a loss of thrust control and an underthrust situation being erroneously indicated on account of engine surge.

LIST OF ABBREVIATIONS USED

EPR Engine pressure ratio
EPRcmd command value of the engine pressure ratio
EPRractual actual value of the engine pressure ratio
EPRerror EPRcmd—EPRactual (first control parameter)
N2dot Acceleration of the high-pressure shaft (second control parameter)
N2dot,thresh threshold of the acceleration of the high-pressure shaft (UN2DMN, ON2DMN)
EPRerror,thresh threshold of the engine pressure ratio (UEPRMN, OEPRMN)
UTDET underthrust detection
OTDET overthrust detection
SRGDET detection of engine surge
LOTC loss of thrust control
EEC electronic control system

What is claimed is:

1. A fault detection method for an engine controller for the detection of a loss of thrust control resulting in too low or too high a thrust for an intended positive or negative acceleration, respectively, comprising:
    determining an error of a value relating to engine acceleration or deceleration as a first control parameter,
    measuring a second control parameter (dependent on engine acceleration or deceleration,
    comparing each of the two control parameters to a respective specified threshold),
    determining a simultaneous transgression of the respective thresholds,
    detecting the presence of engine surge,
    identifying too high or too low a thrust relative to the intended positive or negative acceleration with both thresholds being transgressed simultaneously, and
    eliminating disturbances caused by signal noise and engine surge.

2. A fault detection method in accordance with claim 1, wherein a positive or negative difference (EPRerror) of a command value (EPRcmd) and an actual value (EPRactual) of an engine pressure ratio (EPR) for engine acceleration or deceleration is used as the first control parameter.

3. A fault detection method in accordance with claim 2, wherein the second parameter is the positive or negative acceleration (N2dot) of at least one of a high-pressure shaft, an intermediate-pressure shaft and a low-pressure shaft of the engine.

4. A fault detection method in accordance with claim 2, wherein the second parameter is a time derivative of at least one of a pressure and a pressure ratio in the engine.

5. A fault detection method in accordance with claim 2, wherein the second parameter is a time derivative of a fuel flow.

6. A fault detection method in accordance with claim 2, wherein the second parameter is a time derivative of a torque of an engine shaft.

7. A fault detection method in accordance with claim 2, wherein the second parameter is a time derivative of at least one of an engine temperature and an engine temperature ratio.

8. A fault detection method in accordance with claim 3, wherein the specified threshold of the first control parameter and the specified threshold of the second control parameter each represent a limit for the avoidance of disturbances caused by signal noise in an overthrust situation (−OEPRMN, −ON2DMN) or in an underthrust situation (+UEPRMN, +UN2DMN).

9. A fault detection method in accordance with claim 8, wherein the threshold of the error of the engine pressure ratio is approx. +/−0.15, respectively, and the threshold of the acceleration of an engine shaft as the second control parameter is approx. +/−0.1%/sec, respectively, with an EPRerror>0.15 and a simultaneously established N2dot<0.1%/sec identifying an underthrust situation for an intended acceleration and an EPRerror<−0.15 and a simultaneously established N2dot>−0.1%/sec identifying an overthrust situation for an intended deceleration.

10. A fault detection method in accordance with claim 1, wherein a result of a simultaneous comparison of the first and the second control parameter with the respective threshold is overwritten with a "false" indication if engine surge is detected (SRGDET) in order to prevent a detection of loss of thrust control caused by engine surge being disturbed.

11. A fault detection method in accordance with claim 1, wherein the specified threshold of the first control parameter and the specified threshold of the second control parameter each represent a limit for the avoidance of disturbances caused by signal noise in an overthrust situation (−OEPRMN, −ON2DMN) or in an underthrust situation (+UEPRMN, +UN2DMN).

12. A fault detection method in accordance with claim 1, wherein the second parameter is the positive or negative acceleration (N2dot) of at least one of a high-pressure shaft, an intermediate-pressure shaft and a low-pressure shaft of the engine.

13. A fault detection method in accordance with claim 1, wherein the second parameter is the time derivative at least one of a pressure and a pressure ratio in the engine.

14. A fault detection method in accordance with claim 1, wherein the second parameter is a time derivative of a fuel flow.

15. A fault detection method in accordance with claim 1, wherein the second parameter is a derivative of a torque of an engine shaft.

16. A fault detection method in accordance with claim 1, wherein the second parameter is a time derivative of at least one of an engine temperature and an engine temperature ratio.

\* \* \* \* \*